(12) United States Patent
Murakami

(10) Patent No.: US 10,655,510 B2
(45) Date of Patent: May 19, 2020

(54) INTAKE/EXHAUST VALVE AND OPERATION CONTROL METHOD FOR INTERNAL COMBUSTION ENGINE

(71) Applicant: OZMA ELECTRONIC CONTROL CO., LTD., Saitama (JP)

(72) Inventor: Kazuto Murakami, Saitama (JP)

(73) Assignee: OZMA ELECTRONIC CONTROL CO., LTD., Saitama (JP)

(*) Notice: Subject to any disclaimer, the term of this patent is extended or adjusted under 35 U.S.C. 154(b) by 0 days.

(21) Appl. No.: 16/334,216

(22) PCT Filed: Sep. 21, 2016

(86) PCT No.: PCT/JP2016/077909
§ 371 (c)(1),
(2) Date: Mar. 18, 2019

(87) PCT Pub. No.: WO2018/055711
PCT Pub. Date: Mar. 29, 2018

(65) Prior Publication Data
US 2020/0056517 A1 Feb. 20, 2020

(51) Int. Cl.
*F01L 7/06* (2006.01)
*F01L 9/04* (2006.01)
(Continued)

(52) U.S. Cl.
CPC ........ *F01L 7/06* (2013.01); *F01L 9/04* (2013.01); *F16K 3/0254* (2013.01); *F16K 3/03* (2013.01);
(Continued)

(58) Field of Classification Search
CPC ....... F01L 7/06; F01L 9/04; F01L 2009/0405; F01L 2009/0428; F16K 31/08;
(Continued)

(56) References Cited

U.S. PATENT DOCUMENTS 4,156,437 A * 5/1979 Chivens ............... F16K 11/0743
137/554
5,158,262 A * 10/1992 Kamerbeek ........... F16K 31/082
251/129.11
(Continued)

FOREIGN PATENT DOCUMENTS

JP 48-045232 6/1973
JP 63-150076 10/1988
(Continued)

OTHER PUBLICATIONS

Official Communication issued in International Bureau of WIPO Patent Application No. PCT/JP2016/077909, dated Nov. 29, 2016.
(Continued)

*Primary Examiner* — Grant Moubry
(74) *Attorney, Agent, or Firm* — Greenblum & Bernstein, P.L.C.

(57) ABSTRACT

A housing of an exhaust valve is provided for an exhaust port communicating with a combustion chamber. The housing has a plate-shaped portion formed with a plurality of fixed slits radially extending from the central axis of the port. A valve element is provided adjacent to the plate-shaped section, is rotatable around a central axis, and has formed with a plurality of movable slits radially extending from the central axis. Due to the action of electromagnets and a permanent magnet attached to an annular member, the valve body is rotationally displaced around the central axis of the port, and the relative positional relationship between the fixed slits and the movable slits is changed to open and close the exhaust valve. The same is also true for an intake valve.

5 Claims, 7 Drawing Sheets

(51) Int. Cl.
*F16K 3/03* (2006.01)
*F16K 31/06* (2006.01)
*F16K 3/02* (2006.01)

(52) U.S. Cl.
CPC ...... *F16K 31/0668* (2013.01); *F16K 31/0675* (2013.01); *F01L 2009/0405* (2013.01); *F01L 2009/0428* (2013.01)

(58) Field of Classification Search
CPC ............... F16K 31/082; F16K 31/0675; F16K 31/0668; F16K 3/03; F16K 3/0254; F16K 25/00; F16K 27/04; F16K 27/048
See application file for complete search history.

(56) References Cited

U.S. PATENT DOCUMENTS

| | | | | |
|---|---|---|---|---|
| 5,238,023 | A * | 8/1993 | Olofsson | F16K 7/18 137/596.17 |
| 5,669,411 | A * | 9/1997 | LeGros | F04B 39/1033 137/512.1 |
| 6,234,123 | B1 | 5/2001 | Iiyama et al. | |
| 8,740,183 | B2 * | 6/2014 | Hauri | F04B 39/08 137/625.31 |
| 9,316,129 | B2 * | 4/2016 | Hattori | F02M 35/10255 |
| 2001/0001477 | A1 | 5/2001 | Steinebrunner | |
| 2010/0247359 | A1 | 9/2010 | Hauri et al. | |

FOREIGN PATENT DOCUMENTS

| | | |
|---|---|---|
| JP | 64-036509 | 3/1989 |
| JP | 1-124010 | 8/1989 |
| JP | 4-125372 | 4/1992 |
| JP | 5-149117 | 6/1993 |
| JP | 2000-55212 | 2/2000 |
| JP | 2000-64863 | 2/2000 |
| JP | 2007-162664 | 6/2007 |
| JP | 2011-501797 | 1/2011 |
| JP | 2016-35251 | 3/2016 |
| JP | 2016-121572 | 7/2016 |

OTHER PUBLICATIONS

Office Action issued in Japan Counterpart Patent Appl. No. 2017-525439, dated Jun. 26, 2018, along with an English language translation.

Office Action issued in Japan Counterpart Patent Appl. No. 2017-525439, dated Apr. 17, 2018, along with an English language translation.

* cited by examiner

INTAKE/EXHAUST VALVE AND OPERATION CONTROL METHOD FOR INTERNAL COMBUSTION ENGINE

TECHNICAL FIELD

The present invention relates to an intake/exhaust valve, which opens and closes an intake/exhaust port in an internal combustion engine such as an automobile engine.

BACKGROUND ART

An intake/exhaust valve, which opens and closes an intake/exhaust port of an internal combustion engine, is usually a poppet valve, which has a flat-conical shaped valve element and a valve stem extending from the center of the valve element. The valve element is provided in an opening, which is formed in a combustion chamber side of an intake/exhaust port formed in the cylinder head. The valve stem extends into the cylinder head and passes through the cylinder head, and the tip of the valve stem is in contact with a rocker arm provided above the cylinder head (PATENT DOCUMENT 1, for example). The rocker arm is swung by a cam formed on a cam shaft, so that the valve element opens and closes the intake/exhaust port.

PRIOR ART DOCUMENT

Patent Document

PATENT DOCUMENT 1: Japanese Unexamined Patent Publication No. 2016-121572

SUMMARY OF THE INVENTION

Problem to be Solved by the Invention

As described above, a mechanism such as a cam shaft, a rocker arm and so on for opening and closing the intake/exhaust valve is arranged over the cylinder head. Therefore, conventionally, a space for accommodating a lot of parts has to be secured, which makes miniaturization of the engine difficult. Furthermore, for improving the engine performance, it is necessary to control the supply of the air-fuel mixture into the combustion chamber and the discharge of the exhaust gas from the combustion chamber with high accuracy, but the opening-closing operation cannot be precisely controlled with a conventional intake/exhaust valve. Thus, there has been a certain limit to the potential improvement of the engine performance.

An object of the present invention is to simplify a device for opening and closing an intake/exhaust valve, by which the engine can be miniaturized, and to enhance the freedom of the opening-closing operation of the valve, by which the engine performance can be improved.

Means for Solving the Problems

The present invention is an intake/exhaust valve for an internal combustion engine, comprising: a housing provided on an intake port and/or an exhaust port, which communicates with a combustion chamber, the housing having a plate-shaped portion formed with a plurality of fixed slits radially extending from the central axis of the port; a valve element provided adjacent to the plate-shaped portion, the valve element being rotatable about the central axis and being formed with a plurality of movable slits radially extending from the central axis; and a drive mechanism rotating the valve element about the central axis to change a relative positional relationship between the fixed slits and the movable slits.

Preferably, one of the valve element and the plate-shaped portion forms a part of an inner wall defining the combustion chamber.

The drive mechanism comprises, for example, an annular member, which is provided in the housing to be rotatable about the central axis and has permanent magnets arranged evenly distributed around the central axis, and electromagnets, which are provided outside the housing and are disposed at positions corresponding to the permanent magnets.

Preferably, the electromagnets are arranged such that first and second ends of the iron core are close to the annular member, the permanent magnets are arranged such that an N-pole or an S-pole is close to the first and second ends, and when the first end faces one of the electromagnets, the second end is offset from the other electromagnet.

A first operation control method for an internal combustion engine according to the present invention is characterized in that at least one of the intake/exhaust valves is closed in an exhaust stroke and/or an intake stroke. In this method, the intake/exhaust valve may be opened in the middle of the exhaust stroke and/or the intake stroke.

A second operation control method for an internal combustion engine according to the present invention is characterized in that the exhaust valve is opened at the beginning of the compression stroke.

Effect of the Invention

According to the present invention, an intake/exhaust valve can be obtained, by which the engine can be miniaturized and the engine performance can be improved, and furthermore various kinds of operation controls can be performed in the internal combustion engine.

EMBODIMENT OF THE INVENTION

In the following, with reference to the drawings, the first embodiment of the present invention will be described.

Figure 1:
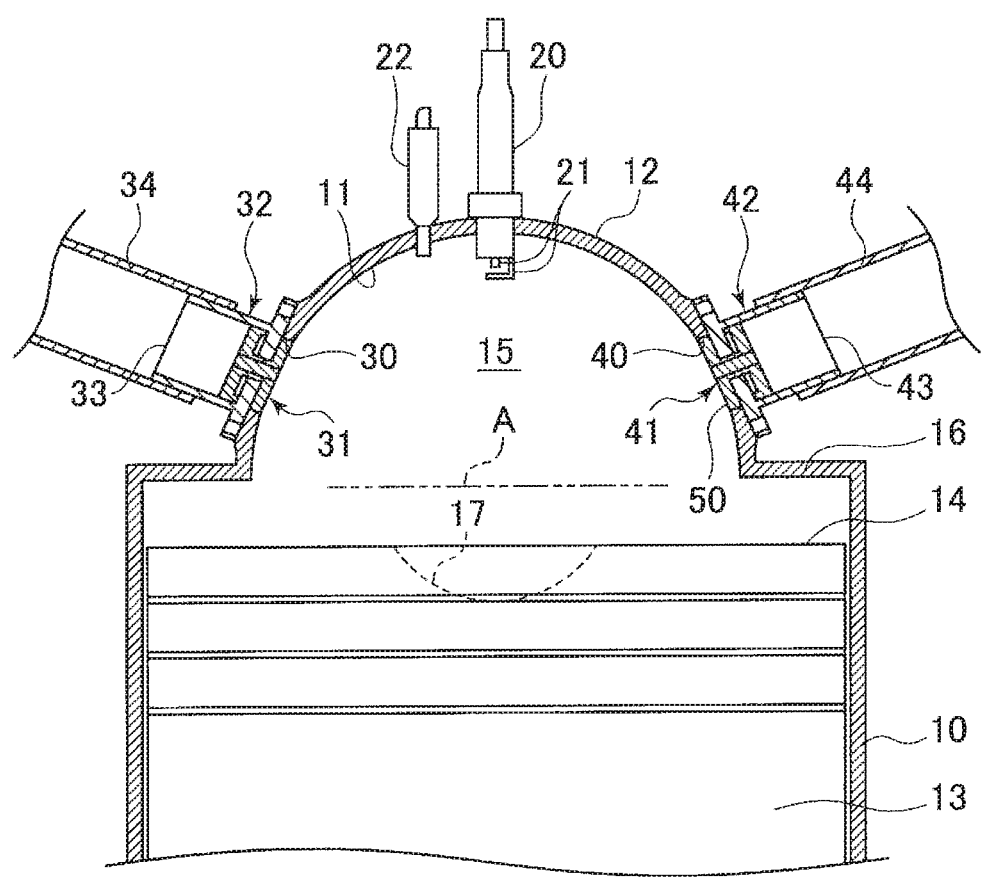
FIG. 1 is a sectional view showing a main part of an engine provided with an intake/exhaust valve, which is a first embodiment of the present invention.

With reference to FIG. 1, a cylinder head 12 having a hemispherical inner wall 11 is provided over a cylinder block 10, and a combustion chamber 15 is formed between an upper surface 14 of a piston 13, which is provided in the cylinder block 10 in an elevating/lowering manner, and the hemispherical inner wall 11. The piston 13 is lifted up to a position such that the upper surface 14 comes close to a flat portion 16 of the cylinder head 12, or close to the lower end of the hemispherical inner wall 11. In FIG. 1, the top dead center of the piston is indicated by reference "A".

A spark plug 20 is attached to a top section of the cylinder head 12. An electrode 21 of the spark plug 20 projects from the hemispherical inner wall 11 into the combustion chamber 15. A direct fuel injector 22 for injecting fuel in the combustion chamber 15 is attached close to the spark plug 20 in the cylinder head 12. The fuel injector 22 is configured to inject fuel toward the upper surface 14 of the piston 13. A recess 17 is formed on the upper surface 14 of the piston 13 to form a tumble current.

An intake port 30 and an exhaust port 40 are formed in the cylinder head 12. An intake valve 31 is attached to the intake port 30, and an exhaust valve 41 is attached to the exhaust port 40. A housing 32 of the intake valve 31 is fixed to an outer surface of the cylinder head 12, and an intake pipe 34 is fitted to an opening 33 of the housing 32, which is opposite to the cylinder head 12. Similarly, a housing 42 of the exhaust valve 41 is fixed to an outer surface of the cylinder head 12, and an exhaust pipe 44 is fitted to an opening 43 of the housing 42, which is opposite to the cylinder head 12.

Figure 2:
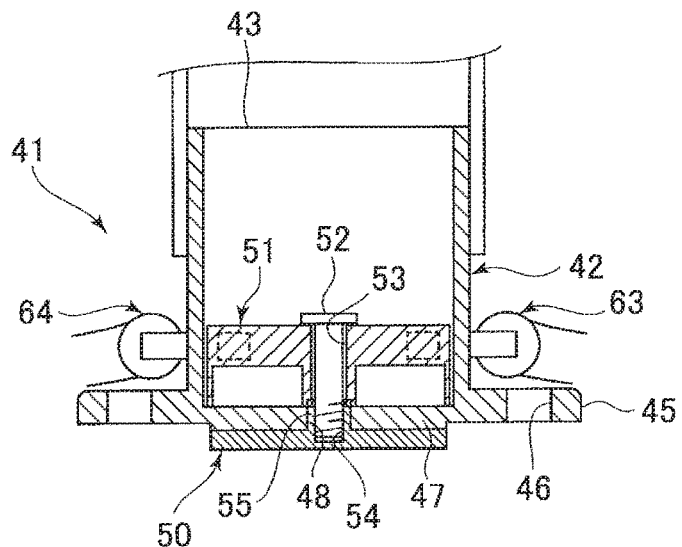
FIG. 2 is a sectional view showing an exhaust valve of the first embodiment.
Figure 3:
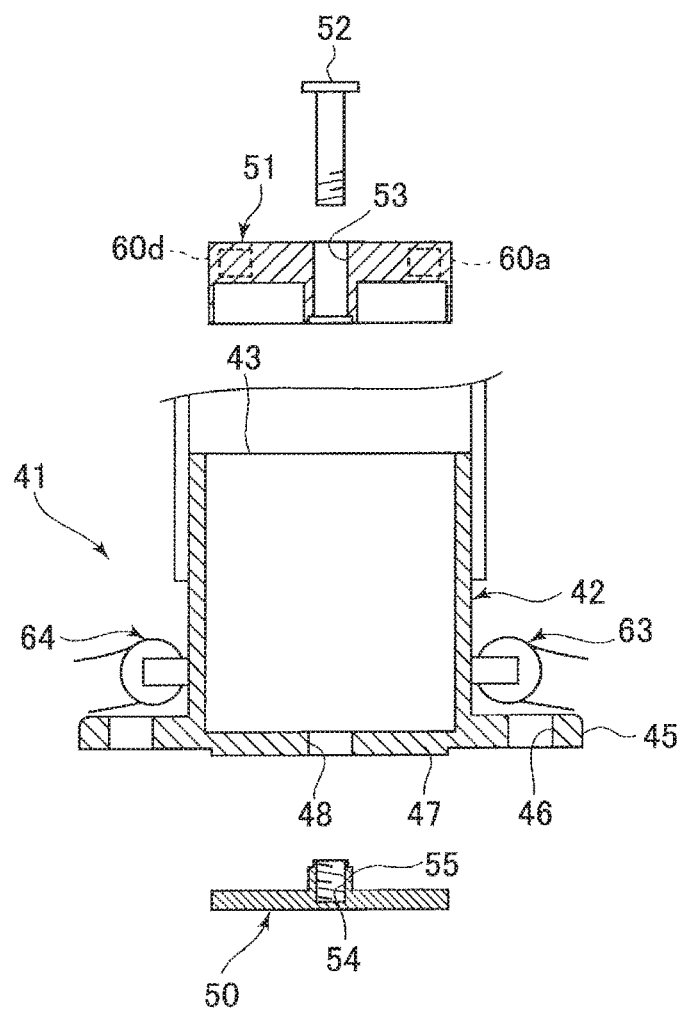
FIG. 3 is an exploded sectional view of the exhaust valve of the first embodiment.

With reference to FIGS. 2 and 3, a structure of the exhaust valve 41 is roughly described below. Note that, since a structure of the intake valve 31 is the same as that of the exhaust valve 41, the explanation of the structure of the intake valve 31 is omitted.

A flange 45 is provided on an outer periphery of an end portion on the cylinder head 12 side of the housing 42, and a hole 46 for attaching a bolt is formed in the flange 45. A circular plate-shaped portion 47 is formed inside the housing 42 and at a position corresponding to the flange 45. A circular disk-shaped valve element 50 having the same diameter as the plate-shaped portion 47 is provided outside the housing 42 and close to the plate-shaped portion 47. The valve element 50 forms a part of the inner wall 11 defining the combustion chamber 15 (see FIG. 1).

On the other hand, an annular member 51 having a slightly greater diameter than the plate-shaped portion 47 is provided in the housing 42. The annular member 51 is provided with permanent magnets 60a-60d (see FIG. 5) as described later. The annular member 51 is connected to a projecting portion 55 of the valve element 50 through a bolt 52. Holes 53, 54 are formed in the annular member 51 and the projecting portion 55, and a hole 48, through which the projecting portion 55 passes, is formed in the plate-shaped portion 47. Note that the hole 54 formed in the projecting portion 55 does not pierce the valve element 50, and an opening is not formed on the surface on the combustion 15 side of the valve element 50, except for movable slits 61 (see FIG. 4), which are described later.

Thus, the valve element 50 is integrally connected to the annular member 51 by the bolt 52, so that the valve member 50 and the annular member 51 are rotatable relative to the plate-shaped portion 47 or the housing 42. Electromagnets 63, 64 are provided outside the housing 42, and thus, by energizing the electromagnets 63, 64, the annular member 51 is rotated and the valve element 50 is rotated with respect to the plate-shaped portion 47.

Figure 4:
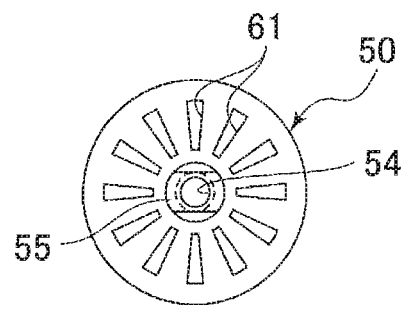
FIG. 4 is a front view showing a valve element of the first embodiment.

FIG. 4 is a view of the valve element 50 from the perspective of the opening 43 of the housing 42. As shown in this drawing, the valve element 50 is formed with a plurality of movable slits 61 radially extending from the center (central axis of the exhaust port), and the cylindrical projecting portion 55 fitted to the hole 48 of the plate-shaped portion 47 is formed at the center. The movable slits 61 are formed at equal angular intervals (30 degrees, in this example), and are fan-shaped, in which the opening of each slit is narrower near the center and expands wider with increasing distance from the center.

Figure 5:
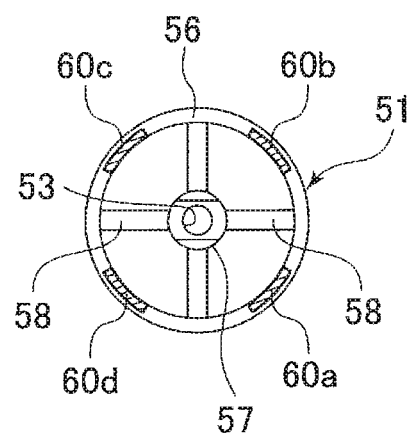
FIG. 5 is a front view showing an annular member of the first embodiment.

FIG. 5 is a view of the annular member 51 from the perspective of the plate-shaped portion 47 of the housing 42. As shown in this drawing, the annular member 51 has a cylindrical body 56 and a shaft portion 57 positioned at the cylinder center of the body 56, and the body 56 and the shaft portion 57 are connected by a plurality of connecting members 58. The connecting members 58 radially extend from the shaft portion 57, and are provided at 90 degree intervals. The permanent magnets 60a-60d are arranged between the connecting portions of the connecting members 58 and the body 56.

Figure 6:
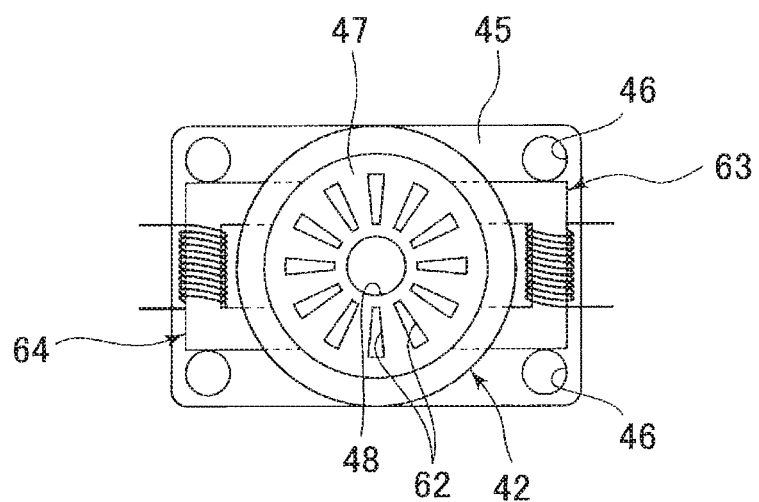
FIG. 6 is a front view showing fixed slits and electromagnets of an exhaust valve of the first embodiment.

FIG. 6 is a view of the housing 42 from the perspective of the opening 43, in which the annular member 51 is omitted. The plate-shaped portion 47 is formed with a plurality of fixed slits 62 radially extending from the hole 48. The fixed slits 62 are formed at equal angular intervals (30 degrees, in this example), and are fan-shaped, in which the opening of each slit is narrower near the center and expands wider with increasing distance from the center, similar to the movable slits 61. First and second electromagnets 63, 64 are arranged outside the housing 42. The electromagnets 63, 64 are provided above the flange 45 and arranged at positions corresponding to the permanent magnets 60a-60d, as described later.

Figure 7:
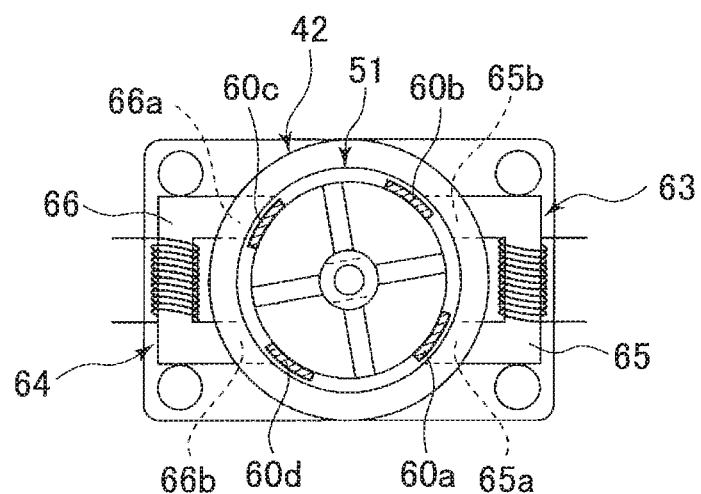
FIG. 7 is a front view showing a positional relationship between the electromagnets and permanent magnets of the exhaust valve of the first embodiment.

With reference to FIG. 7, a positional relationship between the first and second electromagnets 63, 64 and the permanent magnets 60a-60d is described below. An iron core 65 of the first electromagnet 63 is U-shaped, and first and second ends 65a, 65b of the iron core 65 are positioned in holes (not shown) formed in the housing 42 to be close to the annular member 51. In the annular member 51, the permanent magnets 60a, 60b are embedded at positions close to the first and second ends 65a, 65b. In a state shown in the drawing, the first end 65a faces the permanent magnet 60a, and the second end 65b is partially offset from the permanent magnet 60b, such that a part of the permanent magnet 60b faces the second end 65b.

The second electromagnet 64 has a similar structure. That is, an iron core 66 of the second electromagnet 64 is U-shaped, and first and second ends 66a, 66b of the iron core 66 are positioned in holes formed in the housing 42 to be close to the annular member 51. In the annular member 51, the permanent magnets 60c, 60d are embedded at positions close to the first and second ends 66a, 66b. In a state shown in the drawing, the first end 66a faces the permanent magnet 60c, and a part of the second end 66b faces the permanent magnet 60d.

The permanent magnets 60a-60d are arranged such that the N-poles are positioned outside the annular member 51 and the S-poles are positioned inside the annular member 51. Further, when the permanent magnets 60a, 60c face the first ends 65a, 66a, the permanent magnets 60b, 60d are offset in the counterclockwise direction relative to the second ends 65b, 66b in FIG. 7, and when the permanent magnets 60b, 60d face the second ends 65b, 66b, the permanent magnets 60a, 60c are offset in the clockwise direction relative to the second ends 65a, 66a in FIG. 7.

Note that, in the embodiment, the permanent magnets 60a-60d are arranged such that the N-poles are positioned close to the first and second ends 65a, 65b of the electromagnet 63 and the first and second ends 66a, 66b of the electromagnet 64. However, instead of this construction, they may be arranged such that the S-poles are positioned close to the ends 65a, 65b, 66a, 66b of the electromagnets 63, 64.

Figure 8:
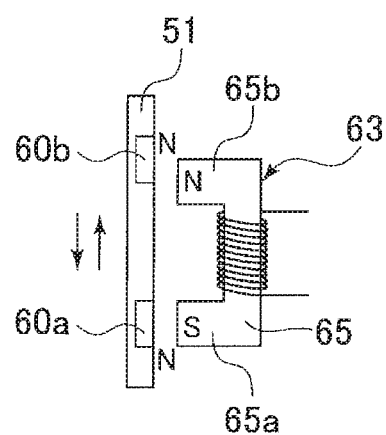
FIG. 8 is a view for explaining an operation of the electromagnets and the permanent magnets of the exhaust valve of the first embodiment.

With reference to FIG. 8, an operation of the electromagnet 63 and permanent magnets 60a, 60b is described below. In a state shown in FIG. 8, the electromagnet 63 is energized such that the current flows in the coil in a predetermined direction, and the first end 65a of the iron core 65 is excited by the S-pole and the second end 65b is excited by the N-pole. Therefore, an attraction force acts between the permanent magnet 60a and the first end 65a, and a repulsion force acts between the permanent magnet 60b and the second end 65b, so that the annular member 51 remains stationary, in which the permanent magnet 60a faces the first end 65a and the permanent magnet 60b is offset from the second end 65b.

If the current applied to the coil of the electromagnet 63 is switched to the opposite direction, the first end 65a of the iron core 65 is excited by the N-pole and the second end 65b is excited by the S-pole. Therefore, a repulsion force acts between the permanent magnet 60a and the first end 65a, and an attraction force acts between the permanent magnet 60b and the second end 65b, so that the annular member 51 displaces downward (clockwise direction in FIG. 7) from the state shown in FIG. 8, and the annular member 51 is set to a state in which the permanent magnet 60b faces the second end 65b and the permanent magnet 60a is offset from the first end 65a.

Thus, by changing the electric current state in the electromagnets 63, 64, the annular member 51 is rotated relative to the electromagnets 63, 64. The angle of the rotational displacement is 15 degrees in the embodiment, which is half the angle (30 degrees) between the two adjacent fixed slits in the plate-shaped portion 47, and half the angle (30 degrees) between the two adjacent movable slits in the valve element 50. The fixed slit 62 and the movable slit 61 mutually overlap or the fixed slit 62 is positioned between the two movable slits 61, depending upon the current conditions of the electromagnets 63, 64. In other words, depending upon the current conditions of the electromagnets 63, 64, the exhaust valve 41 is in either the fully opened state or the fully closed state.

The opening/closing action of the exhaust valve 41 is identical to the intake valve 31. Thus, since the intake valve 31 and the exhaust valve 41 are electronic valves, which open or close only by controlling the current states of the electromagnets 63, 64, a drive mechanism such as a cam shaft, a rocker arm and so are not necessary, which is different from a conventional device. Therefore, a space for housing parts provided above the engine becomes unnecessary, by which the engine can be miniaturized. Further, the opening/closing action of the intake valve 31 and the exhaust valve 41 can be controlled with a higher freedom than a conventional device. Due to this, for example, the effectiveness of the engine-brake can be enhanced and the Miller cycle can be realized.

Figure 9:
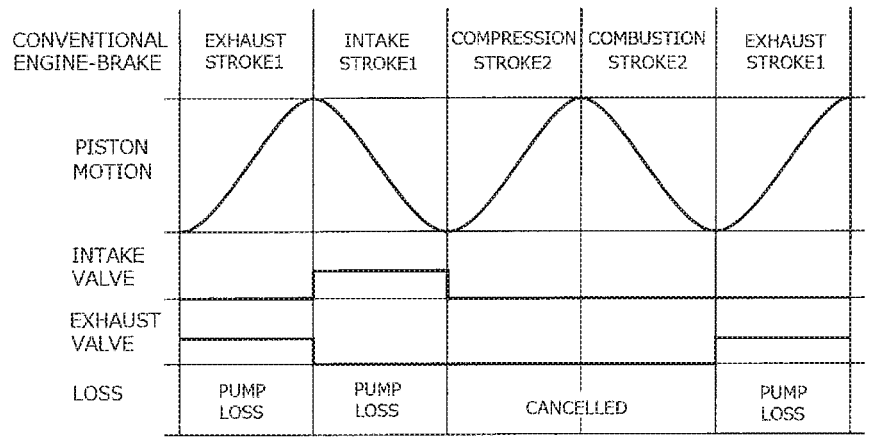
FIG. 9 is a diagram showing a conventional engine-brake operation.
Figure 10:
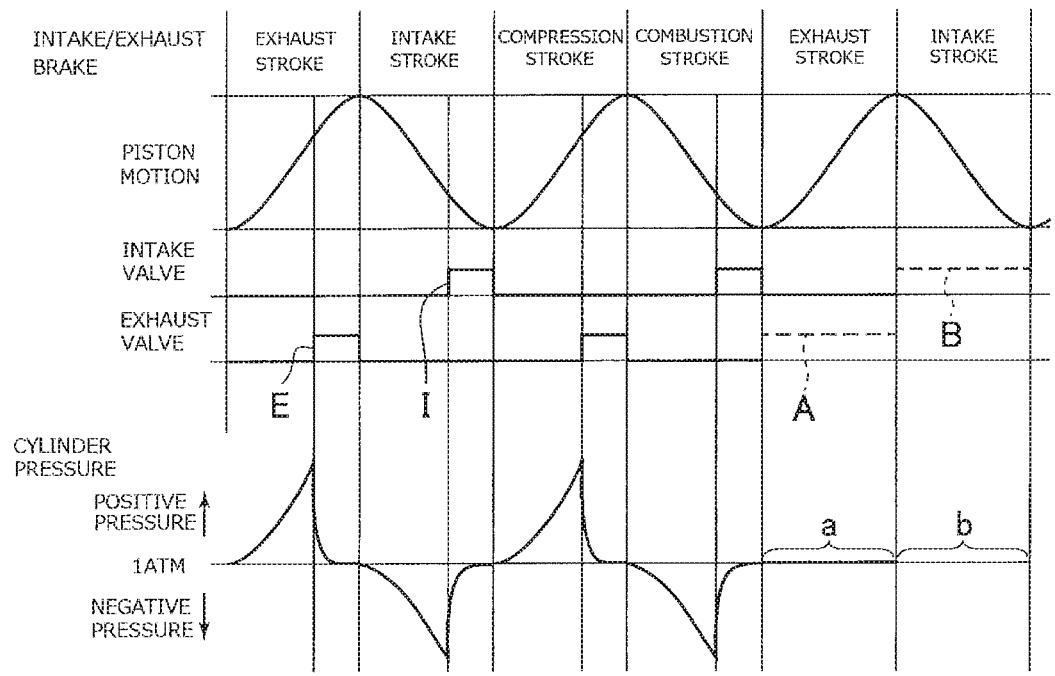
FIG. 10 is a diagram showing an engine-brake operation (i.e., intake/exhaust brake) caused by controlling opening-closing operations of the intake valve and the exhaust valve in the first embodiment.

With reference to FIGS. 9, 10, an operation of the engine-brake is described below.

FIG. 9 illustrates an operation of a conventional engine-brake operation. That is, the intake valve and the exhaust valve are poppet valves, and the fuel injector 22 and the spark plug 20 are suspended. In an exhaust stroke, the exhaust valve is opened and a pump loss, which is caused by the passage resistance of air flowing around the exhaust valve, acts as an engine-brake. In an intake stroke, the intake valve is opened, and in a similar way to the exhaust stroke, a pump loss due to the passage resistance acts as an engine-brake. In a compression stroke and a combustion stroke, both the exhaust valve and the intake valve are closed. Therefore, a pressure rise in the cylinder, which is caused by the rising motion of the piston in the compression stroke, and a pressure drop in the cylinder, which is caused by the falling motion of the piston in the combustion stroke, are cancelled out, and thus, an engine-brake does not act substantially.

FIG. 10 illustrates an engine-brake operation performed by the embodiment, that is, an operation of an intake/exhaust brake caused by controlling opening-closing operations of the intake valve 31 and the exhaust valve 41. In an exhaust stroke, the exhaust valve 41 is closed until halfway, for which a pump loss caused by a pressure rise in the cylinder due to the rising motion of the piston 13, acts as an engine-brake. Then, the exhaust valve 41 is opened (reference "E"), and the pump loss is decreased, so that the engine-brake dissipates. Thus, by opening the exhaust valve 41, the pressure rise in the combustion chamber 15 is suppressed, so that an effect of an engine-brake can be generated in the next intake stroke.

In an intake stroke, the intake valve 31 is closed until halfway, for which a pump loss caused by a pressure drop in the cylinder due to the falling motion of the piston 13 acts as an engine-brake. Then, the intake valve 31 is opened (reference "I"), and the pump loss is decreased, so that the engine-brake dissipates. Thus, by closing the intake valve 31, the pressure drop in the combustion chamber 15 is suppressed, so that an effect of an engine-brake can be generated in the next compression stroke. An operation of the compression stroke is the same as that of the exhaust stroke, and an operation of the combustion stroke is the same as that of the intake stroke.

The effect of the engine-brake becomes greater as the timing at which the intake valve 31 or the exhaust valve 41 is opened, is delayed. However, if the exhaust-brake or the intake-brake become excessive, the vehicle wheels are locked and a steering operation of the vehicle may not work.

Accordingly, in order to eliminate the possibility of such a phenomenon, the opening timing of the exhaust valve 41 or the intake valve 31 indicated by reference "E" or "I", may be advanced, or the exhaust valve 41 or the intake valve 31 may be opened at a predetermined stroke (an exhaust stroke or an intake stroke) as indicated by reference "A" or "B". Due to this, the cylinder pressure becomes approximately 1 atmospheric pressure as shown by references "a" and "b", so that the effect of the exhaust-brake or the intake-brake can be restrained. The opening timing (reference "E") of the exhaust valve 41, the closing timing (reference "I") of the intake valve 31, and the opening (reference "A" or "B") of the exhaust valve 41 or the intake valve 31 in the exhaust stroke or the intake stroke can be freely chosen or combined in accordance with the object.

Figure 11:
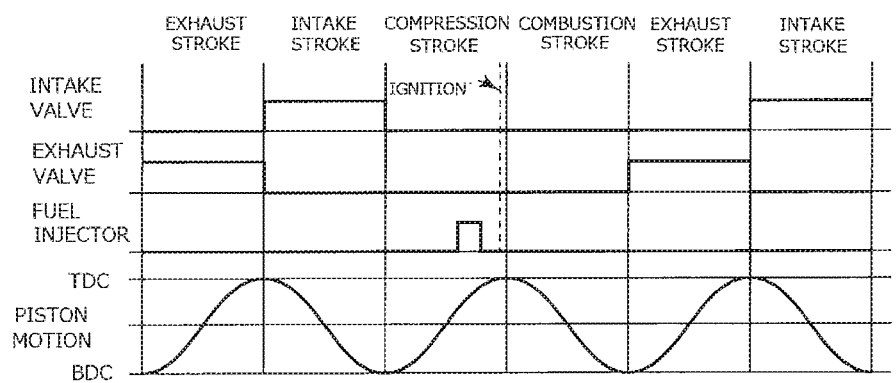
FIG. 11 is a diagram showing a normal driving operation of the first embodiment.
Figure 12:
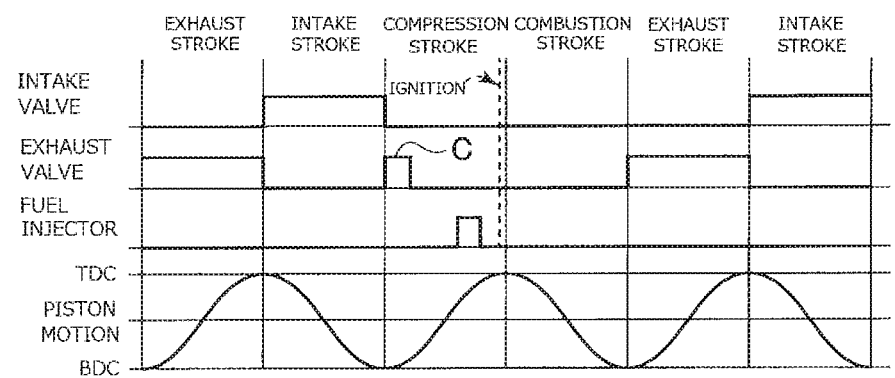
FIG. 12 is a diagram showing an operation of the Miller cycle in the first embodiment.

With reference to FIGS. 11, 12, an operation of the Miller cycle is described below.

FIG. 11 shows a normal driving operation. In an exhaust stroke, the exhaust valve 41 is opened, and in an intake stroke, the intake valve 31 is opened. In a compression stroke, fuel is injected from the fuel injector 22 to generate an air-fuel mixture in the combustion chamber 15. The air-fuel mixture is then ignited by the spark plug 20 and burned. This operation is the same as that of a conventional engine.

FIG. 12 shows an operation of the Miller cycle, which is performed by the embodiment. The difference from the normal drive shown in FIG. 11 is that the exhaust valve 41 is opened at the beginning of a compression stroke (reference "C"). Since a compression operation caused by the piston 13 is not substantially generated when the exhaust valve 41 is opened, the compression ratio and the expansion ratio can be changed, and thus the Miller cycle is realized. The opening timing of the exhaust valve 41 is performed only by controlling the energization of the electromagnets 63, 64, which can be set freely.

As described above, in the embodiment, the housings 32, 42, which are provided on the intake port and the exhaust port communicated with the combustion chamber 15, are provided with the plate-shaped portion 47 formed with a plurality of fixed slits 62 radially extending from the central axis of the port. The valve element 50 formed with a plurality of movable slits 61 radially extending from the central axis is provided adjacent to the plate-shaped portion 47, and is rotatable about the central axis of the port. Furthermore, the drive mechanism is provided, which rotates the valve element 50 about the central axis to change the relative positional relationship between the fixed slits 62 and the movable slits 61. The drive mechanism comprises the annular members 51, which are provided in the housings 32, 42 to be rotatable about the central axis of the ports and have the permanent magnets 60a-60d arranged evenly distributed around the central axis, and the electromagnets 63, 64, which are provided outside the housings 32, 42 and are disposed at positions corresponding to the permanent magnets 60a-60d.

Therefore, according to the embodiment, a device for opening and closing the intake/exhaust valve is simplified to miniaturize the engine and enhance the freedom of the opening-closing operation of the valve, by which the engine performance can be improved.

Figure 13:
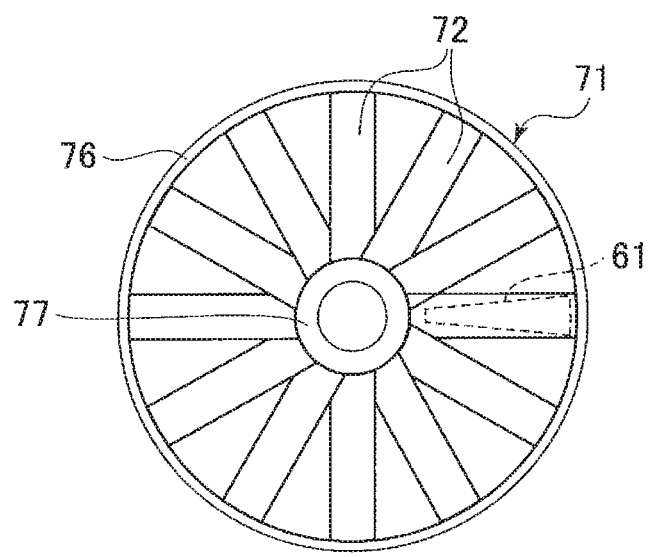
FIG. 13 is a plan view showing an annular member of a second embodiment.
Figure 14:
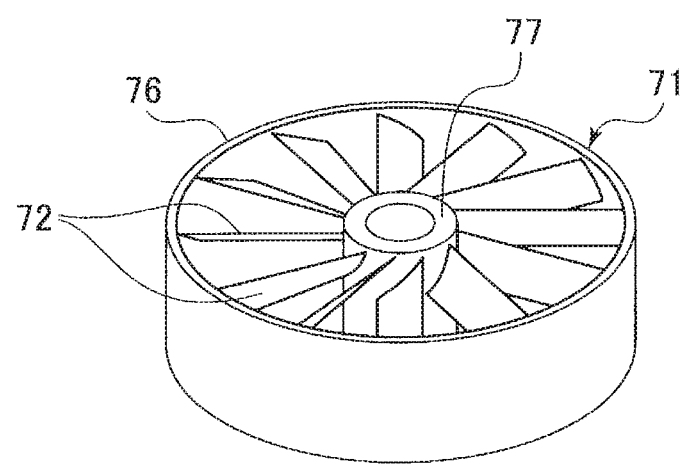
FIG. 14 is a perspective view showing the annular member of the second embodiment.

With reference to FIGS. 13, 14, the second embodiment is described below. FIG. 13 is a two-dimensional plan view showing an annular member 71 from the perspective of the combustion chamber 15, and FIG. 14 is a three-dimensional perspective view showing the annular member 71 again from the perspective of the combustion chamber 15. In the second embodiment, one difference from the first embodiment is the construction of the annular member 71, while the other constructions are the same.

In regard to the annular member 71, the difference between it and the annular member 51 of the first embodiment is the provision of fins 72. The fins 72 are arranged at 30 degree intervals, and the total number is 12 in conformity with the movable slits 61 of the valve element 50 (see FIG. 4). Each fin 72 is arranged to extend radially so as to connect a body 76 of the annular member 71 and a shaft portion 77, and inclined by approximately 45 degrees with respect to the axis of the body 76. The direction of this inclination is set such that, when the intake/exhaust valve is opened from the fully closed condition and the valve element 50 begins to rotate so that the movable slits 61 begin to overlap the fixed slits 62, the rotation of the annular member 51 is accelerated by the air-flow passing through openings formed by the movable slits 61 and the fixed slits 62, and the openings are expanded.

EXPLANATION OF REFERENCES 15 combustion chamber
30 intake port
40 exhaust port
42 housing
47 plate-shaped portion
50 valve element
61 movable slit
62 fixed slit
63, 64 electromagnets

The invention claimed is:

1. An intake/exhaust valve for an internal combustion engine, comprising:
   a housing provided on an intake port and/or an exhaust port, which communicates with a combustion chamber, the housing having a plate-shaped portion provided with a plurality of fixed slits radially extending from a central axis of the port;
   a valve element provided adjacent to the plate-shaped portion, the valve element being rotatable about the central axis and being provided with a plurality of movable slits radially extending from the central axis; and
   a drive mechanism rotating the valve element about the central axis to change a relative positional relationship between the fixed slits and the movable slits;
   wherein the drive mechanism comprises an annular member, provided in the housing to be rotatable about the central axis and has permanent magnets arranged evenly distributed around the central axis, and electromagnets, provided outside the housing and disposed at positions corresponding to the permanent magnets,
   the electromagnets are arranged such that first and second ends of iron cores are close to the annular member, the permanent magnets are arranged such that an N-pole or an S-pole is close to the first and second ends of the iron cores, and when the first end faces one of the electromagnets, the second end is offset from the other electromagnet.

2. The intake/exhaust valve according to claim 1, wherein one of the valve element and the plate-shaped portion forms a part of an inner wall defining the combustion chamber.

3. An operation control method for an internal combustion engine, in which the intake/exhaust valve described in claim 1 is opened and closed, wherein at least one of the intake/exhaust valves is closed in an exhaust stroke and/or an intake stroke.

4. The operation control method according to claim 3, wherein the intake/exhaust valve is opened in the middle of the exhaust stroke and/or the intake stroke.

5. An operation control method for an internal combustion engine, in which the intake/exhaust valve described in claim 1 is opened and closed, wherein the exhaust valve is opened at the beginning of the compression stroke.

* * * * *